United States Patent [19]

Lappin, deceased et al.

[11] 3,800,513

[45] Apr. 2, 1974

[54] ANTI-AIR POLLUTION DEVICE

[76] Inventors: Frank S. Lappin, deceased, late of Chicago, Ill.; Thomas F. Lappin, Rt. 3, Box 809, St. Charles, Ill. 60174; Robert W. Lappin, 10811 Stells Ct., Kensington, Md. 20795 executors

[22] Filed: Feb. 14, 1973

[21] Appl. No.: 332,510

Related U.S. Application Data

[63] Continuation of Ser. No. 208,327, Dec. 15, 1971, abandoned.

[52] U.S. Cl.................. 55/238, 55/257, 55/337, 55/457, 261/79 A
[51] Int. Cl............................................ B01d 47/06
[58] Field of Search ..................... 55/235–238, 55/337, 257, 456, 459, 457; 261/79 A

[56] References Cited
UNITED STATES PATENTS

| | | | |
|---|---|---|---|
| 3,582,051 | 6/1971 | Klein | 55/238 |
| 1,999,589 | 4/1935 | Frey | 55/238 |
| 1,966,280 | 7/1934 | Bingman | 55/259 |
| 2,315,226 | 3/1943 | Rohlin | 55/235 X |
| 2,998,097 | 8/1961 | Baxter | 55/259 X |
| 3,714,764 | 2/1973 | Gethling | 55/235 |
| 1,708,653 | 4/1929 | Boyrie | 55/456 X |
| 963,832 | 7/1910 | Tiemann | 55/456 X |
| 793,110 | 6/1905 | Vehling | 55/238 |
| 2,574,370 | 11/1951 | Bailey | 55/457 |
| 3,296,774 | 1/1967 | Hoogendoorn et al. | 55/238 X |

FOREIGN PATENTS OR APPLICATIONS

| | | | |
|---|---|---|---|
| 42,854 | 1/1908 | Germany | 55/238 |
| 16,822 | 1896 | Great Britain | 55/238 |
| 661,079 | 5/1938 | Germany | 55/457 |
| 359,911 | 2/1938 | Italy | 55/457 |

*Primary Examiner*—Tim R. Miles
*Assistant Examiner*—Vincent Gifford
*Attorney, Agent, or Firm*—Mann, Brown, McWilliams & Bradway

[57] ABSTRACT

An air flow and water washing structure for polluted air. High velocity flow is produced along a spiral path defined by auger flights. Plural water washing curtains are provided between adjacent auger flights.

4 Claims, 4 Drawing Figures

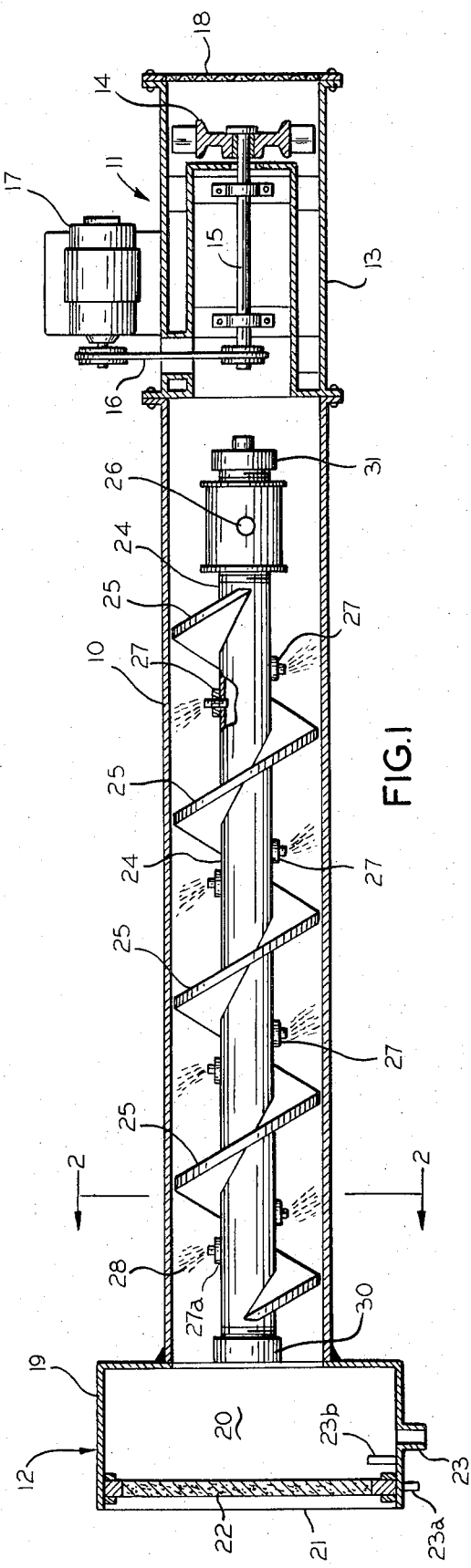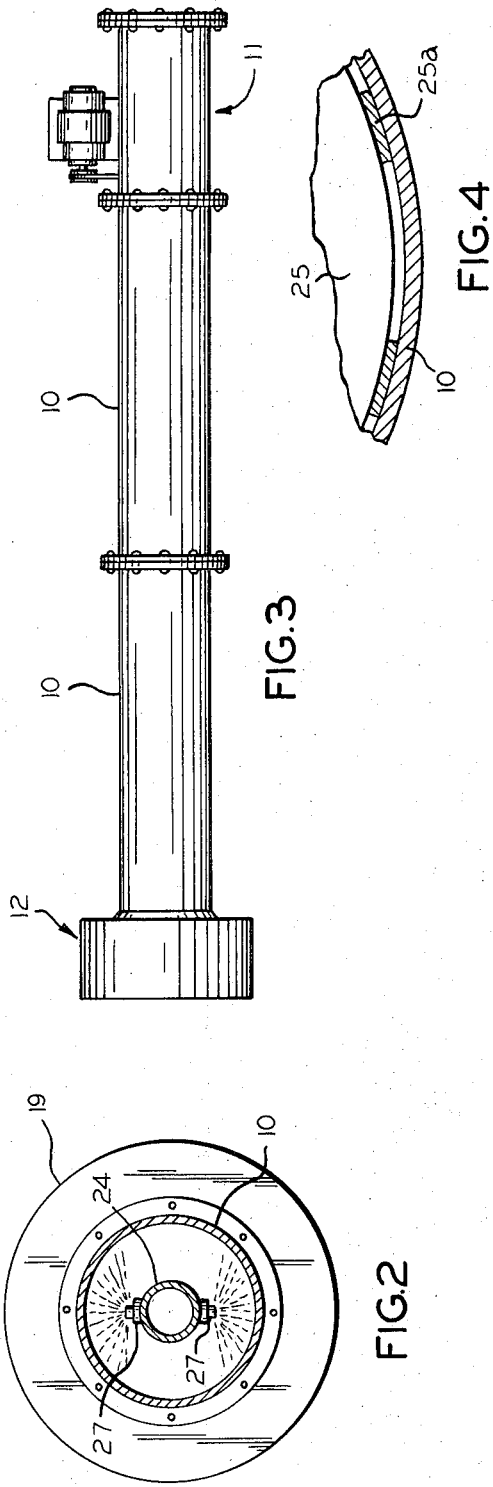

ANTI-AIR POLLUTION DEVICE

This application is a continuation of applicant's copending application, Ser. No. 208,327, filed Dec. 15, 1971 now abandoned.

The present invention is directed to new and useful improvements in apparatus for washing, cleaning and purifying pollution carrying air, which pollution may be caused by chemicals, odors, dust, etc.

The major purposes of the present invention are to provide an air washing structure wherein polluted or contaminated air is forced to pass through successive water washing stages while the air is caused to undergo a highly turbulent flow and at a relatively high velocity to promote thorough mixing of water with the contaminated air; to arrange such an apparatus that the flow of air through the apparatus naturally forces water, contaminated particles, and mixtures thereof to an outside wall of the apparatus where they may pass to a drain; to arrange such an apparatus that it is relatively compact while providing a high degree of water washing and separating action; to provide such an apparatus in a way that it may be used for reclaiming chemicals or other materials carried within the polluted air for reuse; to provide such an apparatus with the capability of handling relatively large sizes of particles in the air being cleaned; to arrange such an apparatus in a way that relatively little maintenance is required, to provide relatively simple, inexpensive and efficient apparatus of this class, all while enabling air purifying apparatus of such a nature that it is easily adaptable to use conditions requiring several washing cycles or a relatively large number of washing cycles.

These and other purposes of the invention will appear from time to time in the course of the ensuing specification and claims when taken with the accompanying drawings, in which:

FIG. 1 is a sectional view of washing apparatus incorporating the principles of the present invention;

FIG. 2 is a sectional view of the apparatus illustrated in FIG. 1;

FIG. 3 illustrates apparatus of the type shown in FIG. 1 and especially adapted for a relatively large scale cleaning operation;

FIG. 4 is a sectional view of a portion of a housing and auger illustrated in FIGS. 1–3.

Like elements are designated by like characters throughout the specification and drawing.

With specific reference now to the drawings and, in the first instance to FIG. 1, the number 10 designates an elongated cylindrical housing defining an air washing, separating and agitating space. An inlet assembly 11 is coupled to one end of the housing 10 and a discharge assembly 12 is coupled to the other end of the cylindrical housing 10. Suitable flanges, bolts and nuts or suitable welding may be utilized to couple these assemblies together. The housing is disposed with its axis substantially horizontal.

The inlet assembly is defined by a generally cylindrical fan housing 13 having fan blades 14 coupled to a shaft 15 to be driven by a belt drive 16 from a motor 17 mounted on the exterior of the housing. An inlet is formed at the end of the housing remote from the cylindrical housing 10. A wire mesh guard, or other suitable guard, 18, is disposed across this inlet.

The motor speed and fan capacity are designed, with relation to the inner diameter of the housing 10, to produce a high velocity flow of air through the guarded inlet 18 and through the housing 10, and to the discharge assembly. This flow should be at a minimum of around 1,200 feet per minute velocity and 1,000 cubic feet per minute for a housing 10 with a diameter of 12 inches, and preferably is considerably higher, such as 2,000 feet per minute velocity and 2,000 cubic feet per minute. This high velocity flow is for a purpose which will be described.

The discharge assembly 12 is defined by a suitable casing 19 defining a chamber 20 opposed to the open, discharge end of the cylindrical housing 10. Casing 19 has an outlet opening spaced from the end of the cylindrical housing as at 21. A filter 22 is positioned across this outlet opening. The outlet area through the filter 22 and opening 21 should be considerably greater than the cross-sectional area through the cylindrical housing 10 so that a pressure drop exists in the chamber 20 during operation. The bottom of the discharge casing includes a drain fitting 23 at a level beneath the level of the cylindrical housing. A drain nipple 23a may be used to drain liquid from filter 22. A baffle 23b may be fixed to the lower wall of casing 19 to define a collecting trough leading to drain 23.

In accordance with the invention, a liquid header pipe 24 is positioned coaxially with the axis of cylindrical housing 10 and extends through the substantial part of the length of the cylindrical housing. Spiral flights 25 are fixed to this liquid header pipe to define an auger extending around the liquid header and through a substantial part of the length of the cylindrical housing. The auger so defined and header 24 are stationary. The pitch of the flights is preferably equal throughout the length of the auger defined by the flights. The flights are solid and are dimensioned to make a relatively close fit with the interior wall of the cylindrical housing 10. The flights are dimensioned to provide a small clearance space of approximately one-eighth inch between the flights and interior wall of the housing. Small spacers, as designated at 25A in FIG. 4, may be fixed to the outer edge of the flights so that these spacers contact the inner wall of the housing, while providing the clearance spaces for flow through the major portion of the periphery of the flights. Three such spacers may be equidistantly spaced around the periphery of the auger for support of the auger in the fashion described. The spacers may be positioned only on the lower portion of the flights.

It may be noted that the entire auger assembly is removable axially through the housing by simply disconnecting the water supply connection to the inlet 26. The auger and header is then axially slidable in and out of the housing. This facilitates cleaning of the housing and auger when necessary and also facilitates initial assembly of the unit. Any axial thrust on the unit produced by the air flow during operation may be resisted by the frictional engagement between the auger and housing, together with the connection with the water supply pipe.

The flights define a spiral passageway for air entering through inlet 18 and cause this air to move around the liquid header 24 through at least three revolutions before it may exit through the discharge assembly 10. The flights 25 should be such as to provide a small, water flow space such as one-eighth inch between the outer edge of the flights and the interior wall of housing 10.

The liquid header pipe 24 has a suitable inlet fitting 26 leading from a source of fluid under pressure (such as washing water) to maintain the header under pressure.

The liquid header has spray nozzles 27 disposed on opposite sides of the liquid header so that a pair of nozzles is positioned between each pair of adjacent flights. The spray nozzles, as is illustrated in FIG. 2, are of a type emitting a fan-shaped spray towards opposite side portions of the inner wall of the housing 10. The nozzles 27 are positioned to direct this fan-shaped spray, as is seen in the drawings, along planes generally parallel to the flights when viewed from one side of the housing and at a position midway between adjacent flights. This provides an angular spray with respect to the wall of the cylindrical housing corresponding to the angle of the flights made therewith.

It is important that there be a longitudinal space in the cylindrical housing 10 between the spray 28 produced by the nozzle 27A nearest to the discharge assembly 12. In fact, the nozzles in the space between the two flights nearest to the discharge assembly may be omitted, provided an adequate number of flights and nozzles are provided along the length of the housing. At least three sets of nozzles and inter-flight spaces should be provided for purposes of washing and separation in a manner which will be described.

FIG. 3 illustrates the adaptability of the unit heretofore described with respect to FIG. 1. In FIG. 3 a relatively large number of flow-directing flights and washing spaces is provided by coupling a plurality of cylindrical housings with flights and nozzles therein, as described with respect to FIG. 1, to each other and to an inlet assembly 11 and an outlet assembly 12 and to each other. In this event, each cylindrical housing 10 may be supplied with its own water header pipe with the headers of each section coupled to each other through a suitable coupling as is designated at 30 and 31 in FIG. 1.

In a typical example of the invention, the cylindrical housing 10 of FIG. 1 may have an overall length of five feet and a diameter of twelve inches. The housing may be formed from one-fourth thick inch polyvinyl plastic or other plastic sheet material which is basically inert to acids and other contaminants. The water header pipe 24 may also be made from a similar plastic material and have a diameter of 2⅜ inches. The flights 25 may be formed from a similar material and on a pitch of 12 inches. The outlet through the filter 22 may be rectangular and 25 inches by 20 inches. The nozzles may be coated or formed from plastic to enhance resistance to acid affects. Fan motor 17 in such an example may be a one-horsepower motor. The fan blade assembly 14 may be coated with plastic and other acid and pollutant resistant material. In accordance with another embodiment of the invention, the apparatus as described previously is utilized without the water spray from the nozzles 27. In this event the apparatus may be so used for the operation of separating acids or other chemicals carried in air in the form of a mist. In this embodiment of the invention, the housing and auger flights are arranged as previously described, while the air inlet velocity and flow rate is as described. The high turbulence produced by the high velocity flow and the spiral pathway thru the several inter-flight spaces in the auger cause the mist to be expelled centrifugally to the inner wall of the housing where it is collected as liquid and led off thru the drain 23.

Other sizes of apparatus may be utilized provided the principles herein stated are used. Also, the housing 10 may be operated with negative pressure at the rates specified instead of the positive pressure blower described.

In operation, the pollutant-laden air is communicated with the inlet opening through guard 18. The fan is driven at a speed such as to induce a flow through the cylindrical housing on the order of 2,000 fpm and 2,000 cfm or even higher. Water is supplied to the water header 24 at relatively low pressure so that the fan-shaped sprays emitted from the spray nozzles 27 will contact the interior wall of the cylindrical housing but without a large impinging force. A water supply at 3 psi and 1½ gallons per minute is satisfactory with a unit as described.

As air passes from the inlet assembly to and through the cylindrical housing 10, the flights 25 induce the air flow into a spiral pattern following the spiral pattern of the flights. The high velocity flow produces a relatively high degree of turbulence of the air as it undergoes this spiral flow. This air must pass the fan-shaped spray between each adjacent pair of flights. The high turbulent flow and spray produce a thorough mixing and washing effect on the air and the cylindrical force of the revolving air flow causes impure particles carried in the air to be forced to the wall of the cylindrical housing. Thus the washing and separating effect between the pair of flights nearest the inlet assembly will remove a certain percentage of impurities from the air, the washing effect between the next successive pair removes a still further percentage of impurities, and so on. The result is relatively clean air as it leaves the space between the flights adjacent to the discharge assembly. Some water is carried with the air as it moves between the interflight spaces but this is expelled toward the wall of the cylindrical housing and with some space provided between the last water spray 27a in the housing and the discharge assembly, substantially all of the water will be disposed around the wall of the housing. Relatively little water is carried with the air as it enters the discharge chamber 20.

It will be noted that the flow of air is in the same overall axial direction as the flow of water and impurities through the clearance spaces between the auger and the housing. Thus, the water and impurities which are forced to the wall of the housing by the high velocity air flow are impelled in a general axial direction by the air flow where it may run off in the relatively low pressure discharge chamber.

The water will drain naturally to the bottom of the discharge assembly and through the drain outlet 23. Filter 22 will help to trap any residual water in the air leaving the unit and the result is relatively clean and dry air discharged through the filter.

When the air being purified carries particles which might be reclaimed for further use, the water drained from the unit and carrying these particles may be processed to separate the particles and water.

The unit as formed is relatively compact and at the same time provides a highly effective washing effect due to the high velocity flow and the successive water spray areas. The water supply can be at relatively low pressure and flow rates so that the circulating water necessary for the system is relatively inexpensive. The high velocity air flow provides an ultimate mixing of air, water and impurities, while the air pattern forces the water and impurities to the wall of the cylindrical container where they may pass to the drain.

The angle of the nozzles is provided to minimize resistance provided by the sprays to the flow of the air. This helps to reduce the static air pressure in the system.

With the air discharge assembly formed in the manner described, the air velocity through the discharge filter may be approximately 500 to 600 feet per minute when the velocity in the cylindrical housing is around 2,000 feet per minute as described.

It should be noted that the air with pollutants of relatively large particle size is easily accommodated with the invention in that relatively large flow spaces are provided for the air and pollutants. The separating effect is provided by the velocity of the air flow, the spiral pathway, and turbulence produced in the air flow, and the ultimate mixing of the air flow with the water sprays.

I claim:

1. Apparatus for washing, cleaning and purifying polluted air including an elongated cylindrical housing, said housing having successive flights defining an auger positioned therein with the flights fixed relatively to the interior wall of said housing, said flights defining at least three inter-flight spaces between successive adjacent pairs of flights along the length of said housing, said flights and housing having a relatively close fit with one another while providing small clearance spaces therebetween, said housing being disposed substantially horizontally, a liquid header supported within said housing and extending coaxially with the longitudinal axis thereof, means for supplying liquid to said header, said header having spray nozzles disposed in the space between adjacent pairs of flights of said auger to direct substantially a solid wall of liquid to the interior wall of said housing and around said header between each adjacent pair of flights, a discharge assembly positioned adjacent one end of said housing, said discharge assembly including air outlet means and filter means disposed across said outlet means, said discharge assembly additionally including liquid outlet means therein for liquid flowing from said housing, the cross-sectional flow area through said air outlet means being greater than the cross-sectional flow area through said housing to thereby produce a pressure drop in said discharge assembly, and a blower housing and blower therein for inducing a relatively high velocity of contaminated air to and through said housing to said discharge assembly, said blower housing and blower connected to the end of said housing opposite to said discharge assembly, said blower causing flow of water through said clearance spaces and to said discharge assembly in the same axial direction as the axial direction of the flow of air through said housing, said blower providing a flow rate and flow capacity of an extent sufficient to force impurities to the exterior wall of said housing for subsequent passage through said clearance spaces, whereby polluted air so admitted is constrained to a high velocity, turbulent, spiral path through the spaces between flights and through the washing wall provided by said nozzles.

2. Apparatus as set forth in claim 1 wherein said means for admitting liquid and said nozzles are formed and adapted to provide relatively low pressure liquid in said water wall.

3. Apparatus as set forth in claim 1 wherein said nozzles are disposed to direct water at an angle to said header and to the interior wall of said housing corresponding to the angle made by said flights with said housing, said nozzles being positioned centrally between adjacent flights.

4. The apparatus of claim 1 wherein said auger is detachably connected with said liquid supply means so that said auger and header are removable from said housing through axial sliding movement with respect thereto.

* * * * *